Dec. 17, 1968 K. D. WALLENTOWITZ 3,417,297

ELECTRONIC TIMER CIRCUITS

Filed Oct. 31, 1966 2 Sheets-Sheet 1

INVENTOR.
Klaus D. Wallentowitz
BY
Stephen A. Roen
ATTORNEY.

INVENTOR.
Klaus D. Wallentowitz
BY
Stephen A. Roen
ATTORNEY.

United States Patent Office 3,417,297
Patented Dec. 17, 1968

3,417,297

ELECTRONIC TIMER CIRCUITS

Klaus D. Wallentowitz, Waterbury, Conn., assignor to General Time Corporation, Stamford, Conn., a corporation of Delaware Continuation-in-part of application Ser. No. 405,503, Oct. 21, 1964. This application Oct. 31, 1966, Ser. No. 591,016
8 Claims. (Cl. 317—142)

ABSTRACT OF THE DISCLOSURE

A timer circuit energized from an alternating voltage source. One branch of a bridge includes a rectifier and filter to provide a direct reference voltage at a point therein. The other branch includes a rectifier but no filter, to charge the timing capacitor therein with pulsating direct current. When the voltage across the capacitor equals the voltage at the point, a detector energizes a load device with half-wave direct current. Means are provided for increasing the threshold signal voltage level required for energization of the load.

This application is a continuation-in-part of my United States patent applications, Ser. No. 405,503, filed Oct. 21, 1964, now Patent No. 3,355,632 and Ser. No. 589,336 filed Oct. 25, 1966, both entitled "Electronic Timer Circuits." The invention is also closely related to the United States patent applications of Robert S. Lundin, Ser. No. 472,844, filed July 19, 1965 entitled, "Condition Responsive Input Controllers," Ser. No. 479,553, filed Aug. 13, 1965, entitled, "Condition Responsive Process Timer," an application entitled, "Relay Circuit for Half-Wave Alternating Current Energization and Electronic Timer Employing The Same," Ser. No. 589,335, filed Oct. 25, 1966, and Ser. No. 590,707 filed concurrently herewith, entitled "Electronic Timer Circuits." All of the above applications are assigned to the assignee of the present application and are incorporated herein by reference.

This application relates to electronic timer circuits. More particularly, it relates to electronic timer circuits, employing silicon-controlled rectifiers in the output circuits thereof and circuits operating from half-wave rectified alternating current all providing low cost, wide timing range, and quick resetting features.

The present application discloses several electronic timer circuits utilizing a silicon-controlled rectifier (SCR) to control an external load usually a relay. In each circuit a capacitor and resistor are connected in circuit with the trigger and the cathode of the SCR. This network performs three functions, either singly or in combination. (1) It integrates noise signals that may be picked up in the circuit from adjacent radiating sources, such as arcing relays, motor commutators and the like, so that the current supplied to the trigger of the SCR from these noise sources is never great enough to trigger the SCR. (2) It lengthens a very short pulse supplied by some timing detectors into a pulse having sufficient duration to trigger the SCR. A uni-junction transistor detector is specifically disclosed in illustrating this function. (3) It lengthens the pulse supplied to the silicon-controlled rectifier until it is longer than a half cycle when half-wave alternating current is used as the SCR load supply and no holding circuit is provided for the SCR.

There are further disclosed herein three methods for keeping an SCR turned on during the periods of no current in the cycle when the SCR and the load circuit are supplied from half-wave alternating current. These three methods comprise: (1) Supplying the SCR with a small "keep-alive" current from the filter capacitor of a common rectifier DC supply, also used to supply the timing capacitor of the timer circuit. (2) Supplying the "keep-alive" current from a separate small filter capacitor associated with the rectifier employed in the load circuit. This capacitor is preferably provided with a shunting resistor for quickly discharging it when the timer is reset to reduce the reset time thereof; and, (3) Supplying the "keep-alive" current from a small resistor connected to a filter capacitor of a separate DC reference supply for a voltage detector connected in circuit with the timing capacitor of the timer circuit.

Also disclosed herein is the use of a diode connected in circuit to the cathode of the SCR for the purpose of automatically increasing the back-bias thereon in response to any transient pulse currents being applied to the trigger thereof due to line transients, for example. In another embodiment, this diode is continuously supplied with DC current, in order to increase the threshold voltage that must be applied to the SCR trigger before firing; thus, more positively protecting against line transients and noise.

There is further disclosed herein the use of an extra contact on the load relay of an AC energized electronic timer to connect a shunt resistance across the filter capacitor thereof to minimize the reset time thereof and to increase repeat accuracy.

Also disclosed herein is an electronic timer circuit for connection to an alternating current source in which a resistor capacitor timing circuit is supplied with half-wave rectified power for charging the capacitor. The timing interval of this timer is $\pi$ times that achieved in the prior art for a given capacitance value.

The various circuits of the present application utilize the voltage detection circuit of my above-identified co-pending application, Ser. No. 405,503, the relay circuits of the above identified co-pending Lundin application, filed Oct. 24, 1966 and the constant current source capacitor charging method of the above-identified application of Robert S. Lundin, field concurrently herewith. The use of a capacitor connected between the gate and the cathode of a silicon-controlled rectifier in order to provide an extended control signal for the SCR is disclosed in my above-identified co-pending application, filed Oct. 24, 1966 as are the other features of the present invention.

Many electronic timers have been devised according to the prior art for specific applications. Some of these are disclosed and discussed in the above-identified co-pending applications. If an electronic timer circuit is desired for a specific application, a circuit according to the prior art can be chosen to efficiently meet those requirements at the lowest possible cost. However, if the number of timers to be used in the specific application is small, oftentimes the cost of the engineering time required in designing a minimum cost circuit vastly exceeds the resulting circuit cost saving. On the other hand, a timer circuit can be designed according to the prior art which meets a wide variety of stringent specifications and can be employed in nearly all applications. However, these timer circuits are relatively expensive.

Desirable qualities in general purpose electronic timer circuits are timing accuracy, quick reset, little effect on accuracy when timing cycles are quickly repeated (repeat accuracy), consistent fulfillment of specifications, and low cost. A major element of cost in prior art timers are the timing capacitors employed. When the charging of the timing capacitor is effected according to prior art techniques, the range of the timer is relatively restricted in the order of about ten to one; that is, with a given capacitance value, a timer may have a range of from 1 to 10 seconds or 10 to 100 seconds or the like. Larger capacitors are required for the longer time ranges.

The larger the capacitor employed, the larger its leakage current. This leakage current varies with temperature and, therefore, has an adverse effect on timer accuracy. Thus, according to the prior art, electronic timers measuring relatively long time intervals are less accurate than electronic timers measuring relatively shorter time intervals.

Furthermore, large capacitors in the circuit require larger discharge times and adversely affect repeat accuracy and reset time.

Quite large capacitances must be used in long time interval timers, according to the prior art, because these capacitors are charged from a constant voltage supply. The rate of change of the voltage across the capacitor is greatest when the capacitor is less than half-charged to its full capacity and becomes very small when the capacitor is nearly fully charged. Since it is this rate of change that determines the accuracy of prior art voltage detector circuits, large capacitors are used, their size being limited by their leakage current which is chosen to produce timing inaccuracies compatible with the voltage detecting capabilities of the circuit.

Furthermore, long time period adjustable timers according to the prior art require high resistance potentiometers for use as variable resistors in series with their timing capacitors. Such potentiometers are manufactured with very poor control of their temperature coefficient tolerance. This adversely affects timing accuracy and makes the consistent fulfillment of specifications very expensive if not impossible.

Desirable qualities in general purpose electronic timer circuits are timing accuracy, quick reset, little effect on accuracy when timing cycles are quickly repeated and low cost. A low cost timer must normally use a relay output to control a large current. To reduce the number of non-linear and amplifying elements, it is desirable to use an SCR to control the relay. Prior art SCR timer circuits have been relatively expensive because they operated off full wave filtered rectifier supplies.

Another major cost element in prior art timers are the capacitors employed. The larger the total capacitance, the higher the cost. According to the prior art a large timing capacitor or an amplifier stage is required to trigger an SCR. Also, a full wave direct current supply or a large filter capacitor is required to provide a large holding current to the SCR to insure fast switching thereof. This increases cost. Also a large timing capacitor has a large leakage current adversely affecting timing accuracy. Furthermore, large capacitors in the circuit require longer discharge times and adversely affect repeat accuracy and reset time.

A disadvantage of prior art timer relay circuits is that the relays are connected into filtered direct current or to filtered half-wave supplies. If it is desired to abort a timing operation before energization of the relay, the stored energy in the filtered supplies will often momentarily energize the relay. This can be more than a nuisance if, for example, the relay is to operate an explosive charge.

The above-identified co-pending application of Robert S. Lundin filed herewith discloses a relay circuit that can be operated off half-wave rectified alternating current.

Timers must also be insensitive to line voltages transients and to electromagnetic noise pickup. These requirements are difficult to achieve at low cost in prior art timer circuits.

It is, therefore, an object of the present invention to provide electronic timer circuits.

Another object of the invention is to provide electronic timer circuits having relatively broad application at low cost.

Still another object of the invention is to provide electronic timer circuits of the above character having increased timing accuracy.

Yet another object of the invention is to provide electronic timer circuits of the above character having quick reset characteristics.

Another object of the invention is to provide electronic timer circuits of the above character providing timer ranges from zero to fifteen minutes.

Still another object of the invention is to provide electronic timer circuits of the above character providing repeatability in manufacturing without using specially selected components.

Yet another object of the invention is to provide electronic timer circuits of the above character providing greatly increased adjustable timer ranges.

A further object of the invention is to provide electronic timer circuits of the above character employing capacitors as the timing elements.

A still further object of the invention is to provide electronic timer circuits of the above character having good repeat accuracy.

A yet further object of the invention is to provide electronic timer circuits of the above character providing an increased timer delay for a given value of timer capacitor.

A further object of the invention is to provide electronic timer circuits of the above character for operation from alternating current supplies.

A still further object of the invention is to provide electronic timer circuits of the above character having a minimum number of non-linear and amplifying elements.

Another object of the invention is to provide electronic timer circuits of the above character using an SCR to control a relay output.

Still another object of the invention is to provide electronic timer circuits of the above character providing a positive abort feature.

Yet another object of the invention is to provide electronic timer circuits of the above character employing the relay circuit of the above-identified Lundin application filed Oct. 24, 1966.

Still another object of the invention is to provide electronic timer circuits of the above character employing constant current charging of a timing capacitor as disclosed in the above-identified Lundin application filed concurrently herewith.

A further object of the invention is to provide electronic timer circuits of the above character employing only half-wave rectification.

Another object of the invention is to provide electronic timer circuits of the above character insensitive to electromagnetic noise.

Still another object of the invention is to provide electronic timer circuits of the above character insensitive to line transients.

A further object of the invention is to provide electronic timer circuits of the above character for energization from alternating current supplies, having quick reset times.

A still further object of the invention is to provide electronic timer circuits of the above character employing the voltage detectors disclosed in my above-identified application Ser. No. 405,503.

Another object of the invention is to provide adjustable electronic timer circuits of the above character.

Yet another object of the invention is to provide electronic timer circuits of the above character having the qualities of low unit cost, ease of fulfillment of specifications and high reliability.

Other objects of the invention will in part be obvious and will in part appear hereinafter.

The invention accordingly comprises the features of construction, combinations of elements and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which.

The same reference characters refer to the same elements throughout the several views of the drawings.

Figure 1:
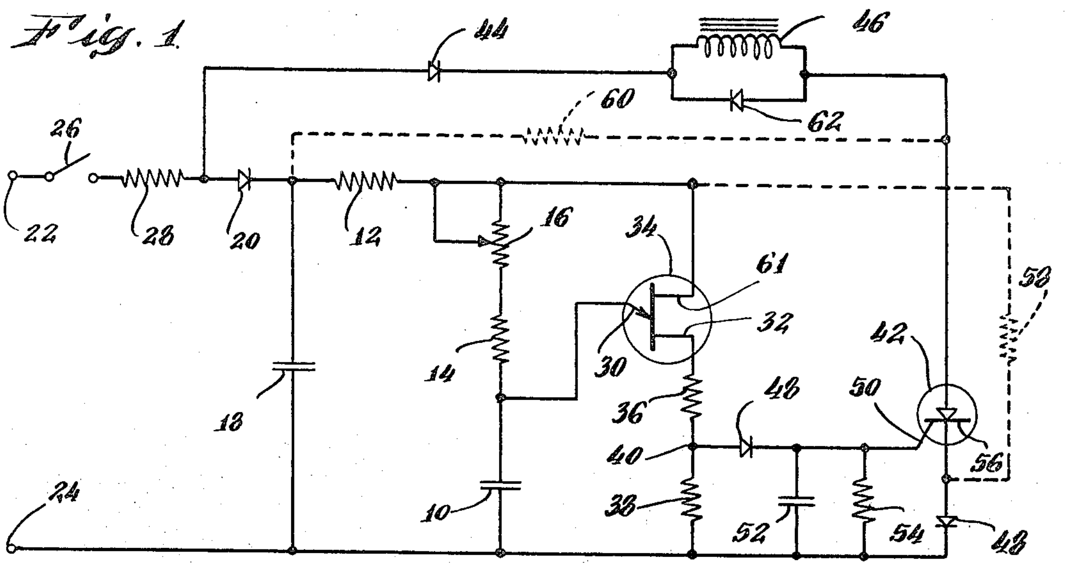
FIGURE 1 is a schematic electrical circuit diagram of an electronic timer according to the present invention.

Now referring to the drawings, a first aspect of my invention is to connect a capacitor 52 and a resistor 54 in parallel (FIGURE 1) in circuit with the trigger 50 and the cathode 56 of an SCR 42. In all of the circuits disclosed herein this capacitor-resistor combination serves the function of integrating any noise signals at the trigger 50 resulting from electromagnetic radiation and the like, thus reducing them to a level that will not cause the SCR 42 to fire.

In the circuit shown in FIGURE 1, the capacitor 52 and resistor 54 have a second purpose; that is, to lengthen the switching pulse supplied by the uni-junction transistor 34 when the timing capacitor 10 has been fully charged. The signal from the base-1, 32 of the uni-junction 34 is very short, of the order of micro-seconds. Due to the integrating action of capicitor 52, this is lengthened to approximately one millisecond, long enough to trigger SCR 42.

When used in the circuit shown in solid lines in FIGURE 1, the capacitor 52 and resistor 54 may serve a third purpose of lengthening the pulse supplied to SCR 42 so that it is longer than the periods of no-current in the half-wave rectified power supplied through SCR 42 through diode 44 and relay coil 46 so that the trigger pulse will exist on trigger 50 during the positive half of the cycle and cause relay 46 to pull in. However, this additional lengthening of the trigger pulses is unnecessary if a risistor 60 is connected as shown by doted lines to provide a "keep alive" current to the SCR 42 from the filter capacitor 18.

Figure 2:
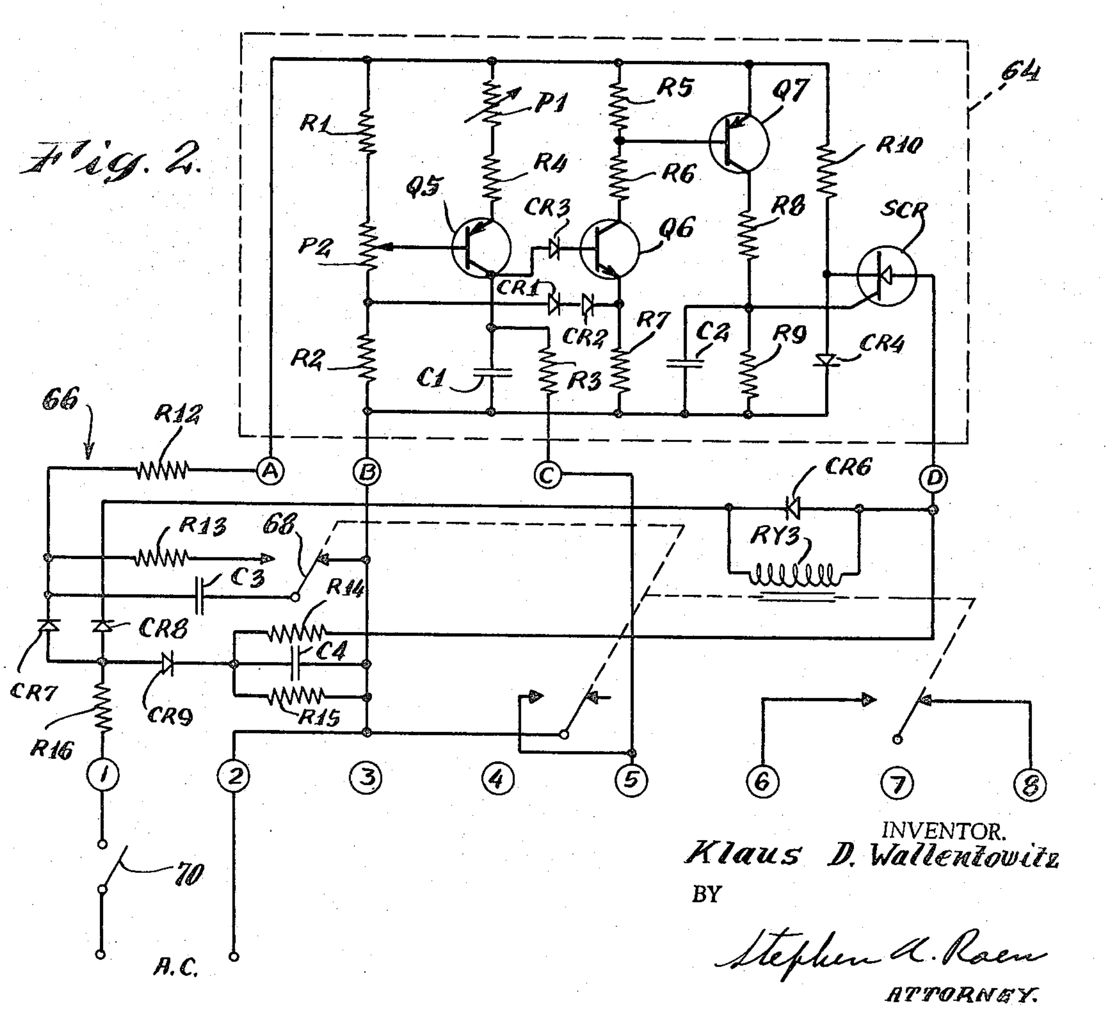
FIGURE 2 is a schematic electrical circuit diagram of another electronic timer according to the present invention.
Figure 4:
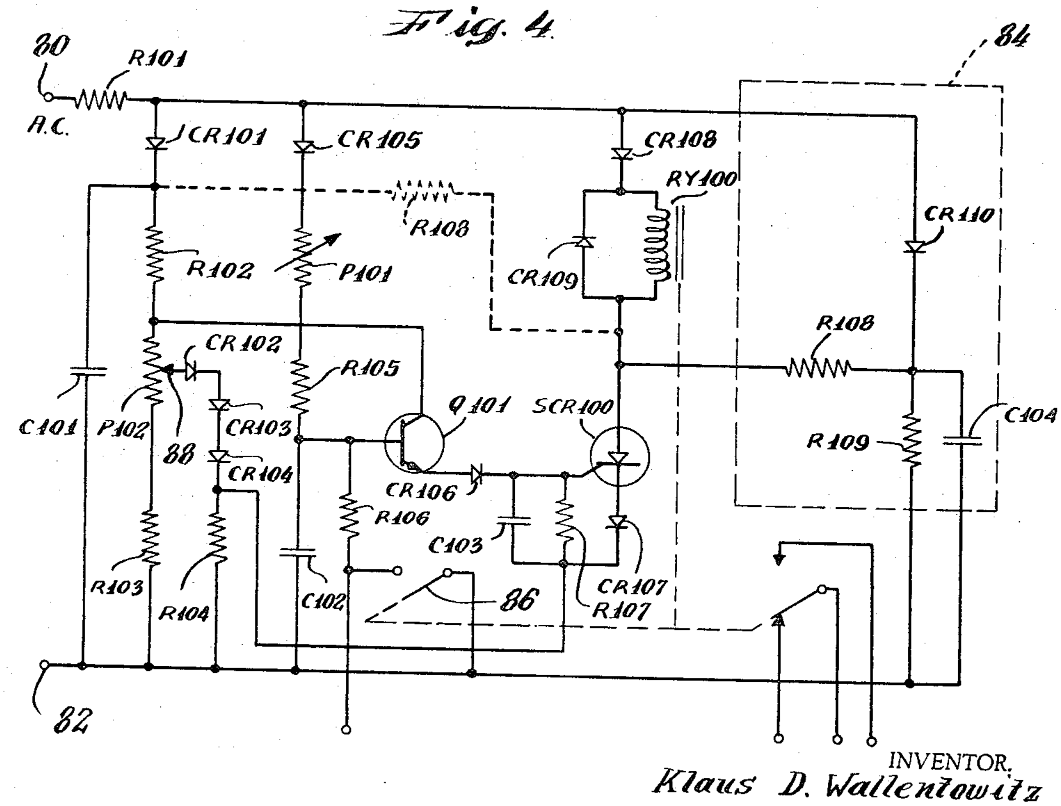
FIGURE 4 is a schematic electrical circuit diagram of another electronic timer circuit according to the present invention.

The capicitor C2 and resistor R9, shown connected in the trigger cathode circuit of the SCR of FIGURE 2, serve only the noise suppression function as do the capacitor 103 and resistor 107 shown in FIGURE 4.

The use of an SCR controlling a relay supplied with half-wave rectified power is disclosed and claimed in my above-identified co-pending application filed on or about Oct. 24, 1966. Disclosed and claimed herein are keep-alive circuits for the SCR; the first comprising the resistor 60, shown in FIGURE 1, supplying keep-alive current from the filter capacitor 18.

Another form of holding circuit is shown in FIGURE 4 wherein a separate small capacitor C104 is connected in circuit with diode CR110 across AC supply line and supplies holding current through resistor R108 to SCR 100. Capacitor C104 is small and is preferably provided with a discharge resistor R109 for rapidly discharging it when the AC supply is terminated to provide an extremely fast reset feature. Alternatively, this holding circuit shown in the dotted box 84 in FIGURE 4 may be dispensed with. Holding current is then applied through a resistor R108 connected as shown by dotted lines to supply power from a filter capacitor C101 associated with a potential reference circuit for the voltage detector circuit connected across timing capacitor 102. This circuit does not provide quite as fast a reset time, as capacitor C101 must be fairly large, but is less expensive than the provision of a separate filter capacitor C104 and associated circuit elements. A separate holding circuit is shown in FIGURE 2 comprising capacitor C4, diode CR9, dropping resistor R14 and discharge resistor R15.

In all of the circuits shown herein a diode, e.g., diode 48 in FIGURE 1, is connected to the cathode 56 of the SCR 42. Equivalent diodes are CR4 in FIGURE 2 and CR107 in FIGURE 4. Now referring to FIGURE 4, the diode CR107 provides some transient protection to the SCR 100 in that any transient current applied to the trigger of SCR 100 must pass through diode CR107 thus back biasing the SCR 100. In this way an amplitude discrimination is provided, preventing spurious triggering.

As shown in FIGURE 1, diode 48 may provide even better transient protection by being supplied with a continuous DC biasing current via a resistor 58 connected as shown by dotted lines to the DC portion of the circuit. This continuous current will induce a continuous back bias across the trigger to cathode junction of the SCR 42, providing a fixed threshold against transients. The same continuous bias is provided by resistor R10 to diode CR4 in FIGURE 2.

As previously stated, my above-identified co-pending application filed on or about Oct. 24, 1966 discloses the short reset time advantages of utilizing half-wave rectified alternating current in the output circuit of a timer. This is shown in FIGURE 1 hereof, which is the same circuit as shown in the figure of my cited application.

An important aspect of the present invention is the operation of other portions of an electronic timer circuit from independent half-wave rectified sources. Referring now to FIGURE 4, there is shown a bridge circuit for charging capacitor C102 and a voltage detector circuit as more fully described in my above-identified co-pending application, Ser. No. 405,503. This circuit provides a timing interval which is independent of line voltage. I have realized that because of this independence of line voltage, the capacitor C102 may be charged with half-wave rectified alternating current, thus lengthening the timing interval provided thereby by a factor of $\pi$. No filter capacitor need be provided to the charging circuit and very quick reset time, and extremely good repeat accuracy may be provided at low cost. The only capacitor required in the timing circuit is capacitor C101, utilized in the potential referencing circuit. This circuit comprises resistor R102, potentiometer P102, and resistor R103. It provides a reference potential at terminal 88 of potentiometer P102. The load circuit is supplied with half-wave rectified alternating circuit through diode CR108 and the reset time thereof is only limited by the dropout time of relay 100. The SCR 100 is preferably provided with keep-alive current from a separate supply through diode CR110, energy being stored in capacitor C104 which is rapidly discharged through resistor 109 when power is removed. When slightly longer reset times are tolerable, the keep-alive current may be supplied through a resistor R108 connected as shown by dotted lines and the circuit shown in the dotted box 84 may be dispensed with, as previously explained.

Now more specifically referring to FIGURE 1, the timing determining elements of that timer circuit comprise capacitor 10, voltage dropping resistor 12, fixed resistor 14 and potentiometer 16 connected in series as shown, as is conventional in many prior art electronic timer circuits. The timing elements 10, 12, 14 and 16 are connected in parallel with a filter capacitor 18 and in series with rectifier 20. These are in turn connected in series with AC supply terminals 22, 24, control switch 26 and a surge protecting resistor 28.

The filtered direct current from the half-wave rectifier charges the capacitor 10. Since the capacitor is connected in circuit with the emitter 30, "base-1" 32 of a uni-junction transistor 34, and resistors 36 and 38, no current will flow from emitter 30 to base 32 until the potential across capacitor 10 exceeds the reverse bias on the emitter to base-1, 32 junction. The junction is then turned ON and the capacitor 10 is discharged through resistors 36 and 38. The potential then developed at terminal 40 triggers an SCR, generally indicated at 42.

It is a feature of the present invention that the SCR is operated from a half-wave rectified AC source. Its circuit can be traced from terminal 22 through switch 26, resistor 28, rectifying diode 44, relay coil 46 and diode 48 back to terminal 24, diode 44 providing the half-wave rectification. According to the invention, means are provided for extending the triggering pulse applied to the trigger 50 of the silicon-controlled rectifier 42. This means comprises a capacitor 52 and resistor 54 providing a relatively long discharge time constant. This may be just long enough to trigger SCR 42 or if no holding circuit is provided therefor slightly longer than half of a cycle of the alternating current. This circuit is isolated from uni-junction transistor 34 by diode 55.

In order to maintain SCR 42 in its conducting state after it has been turned on during the negative half cycle of the AC supply line and to insure fast triggering, I may connect resistor 60 as shown by dotted lines. During the negative half cycles, the energy stored in the capacitor 18 positively biases the SCR 42 through a circuit comprising resistor 60, SCR 42, and diode 48.

The capacitor 18 have a relatively low value in my circuit and provides relatively low holding current to SCR 42. This is because the integration of the trigger pulse provided by capacitor 52 and resistor 54 insures that the SCR 42 will fire at low current values. Since capacitor 18 is small, it stores little energy and the timer circuit is rapidly reset.

The relay 46 continues to be energized through the negative half cycles since the energy stored therein causes a current to flow through diode 62 connected thereacross, providing a self energizing current to the coil 46.

Since I provide the relay circuit with an unfiltered supply, the only energy stored therein is in the relay itself and a quick reset is provided.

As previously explained, the diode 48 will provide a back bias to the SCR 42 in response to any transient current supplied to its trigger-cathode junction, and thus provides some minimum protection against such transient. Protection may be increased by supplying a continuous current through diode 48 by connecting a resistor 58 as shown by the dotted lines. This will provide a fixed back bias on SCR 42 and thus provide a transient threshold.

The capacitor 52 and resistor 54, as shown in FIGURE 1, serve three functions, the first being protection against noise supplied to the trigger 50 of the SCR 42 by integrating such noise currents as may be induced in the timer circuit. The second is to extend the short pulse provided by the uni-junction 34 to a pulse long enough to trigger the SCR 42. And the third, if resistor 60 is not connected, is to lengthen the pulse supplied to the trigger 50 to a duration greater than the length of the negative portions of the half-wave rectified alternating current supplied to the SCR 42. This insures that firing will take place during the positive portion of the alternating current cycle. Such may be a desirable feature in the timer circuit shown in FIGURE 1 if the relay contacts of 46 need only be closed momentarily according to the customer's requirement. Alternatively, a holding circuit may be provided by an extra set of relay contacts on the relay 46, an expedient well known in the prior art. If resistor 60 is employed to provide a holding circuit, the pulse supplied to trigger 40 need not be lengthened to half a cycle as direct current will be continuously supplied to SCR 42 through resistor 60.

The values of the components in the circuit of FIGURE 1 when resistors 58 and 60 are connected as shown are as follows:

Resistor 28 is 10 ohms; resistor 12, 47 kilohms; potentiometer 16, 500 kilohms; resistor 14, 10 kilohms; resistor 36 10 ohms; resistor 38, 47 ohms; resistor 54, 1 kilohm; and resistor 58, 47 kilohms. All of the above resistors are rated at one-half watt. Resistor 60 is 22 kilohms rated at one watt. Diodes 44 and 62 are each type DE200, supplied by Semiconductor Products. Relay 46 may be a 48 volt DC relay supplied by Potter and Brumfield. Diodes 55 and 48 may be type DE50, and diode 20 a type DE300 supplied by Semiconductor Products. SCR 42 is a General Electric type C106B and unijunction 34 a Texas Instrument type S43. Capacitor 18 is a 1 microfarad 200 volt capacitor. Capacitor 10 is a 20 microfarad 50 volt aluminum electrolytic capacitor and capacitor 52 is .1 microfarad.

In FIGURE 2 there is shown in the dotted box 64 an electronic timer circuit of general applicability. This circuit is in general the same as that shown and described in the above-identified application of Robert S. Lundin filed herewith. In addition, in FIGURE 2 there is shown external circuitry, generally indicated at 66, for providing a sustained initiation delay timer having a relay RY3 operated from half-wave rectified alternating current. The relay RY3 has a diode CR6 connected across it for sustained energization during the negative half portions of the half-wave alternating current provided from surge resistor R16 and diode CR8. Terminals 6, 7 and 8 are provided with a single throw double pole switch operated by the relay RY3, as shown. Another switch on the relay RY3 discharges a timing capacitor C1 through resistor R3 when the relay RY3 is energized at the end of a timing interval. 20 volts DC is applied to the timer 64 at terminals A and B through a rectifier network connected across the AC supply terminals 1 and 2. This network comprises surge resistor 16, diode CR7, filter capacitor C3 and dropping resistor R12. It is a feature of my present invention that the double pole single throw contacts 68 of the relay RY3 discharge filter capacitor C3 through discharge resistor R13 upon energization of relay RY3. If this were not the case, the timer circuit supply terminals A and B would be continuously supplied with DC power and upon opening start switch 70, the residual charge on capacitor C3 could charge timing capacitor C1, thus adversely affecting its timing characteristics when the start switch 70 was again closed to initiate another delay interval.

Another feature of my present invention, shown in FIGURE 2 is the separate rectifier supply for the holding or keep-alive current supplied to the SCR of the timer circuit 64. This circuit comprises diode CR9, capacitor C4 and the dropping resistor R14. Thus, a small DC current is continuously supplied to the SCR facilitating its quick triggering at the end of a timing interval and keeping it turned on during the negative portions of the half-wave alternating current supplied to it. In order to quickly turn the SCR off at the end of a timing cycle, I provide discharge resistor R15 connected across capacitor C4 to discharge it within the dropout time of relay RY3.

Except for the operation of the load relay RY3 and the SCR on half-wave alternating current, the timer circuit 64 operates in the same manner as a timing circuit of the above-identified Lundin application filed herewith. That is, upon closing the start switch 70, 20 volts DC is applied to terminals A and B. The timing capacitor C1 starts to build up charge as a result of constant current supplied by the emitter follower stage which consists of transistor Q5 and the associated resistance network R1, P2, R2 and P1 and R4. The current supply for capacitor C1 is controlled by potentiometer P1, thus providing the means for adjustable time duration.

Potentiometer P2 serves as a calibration control for tolerance compensation in order to meet the setting accuracy requirements at all times. That is, during manufacture of the potentiometer P1 is set for the maximum time duration and P2 adjusted until the specified duration is achieved. The voltage build-up across capacitor C1 is compared with a reference voltage derived from resistor R2. As soon as the voltage across capacitor C2 starts to exceed the reference voltage, transistor Q5 will draw base current. As a result, signal generation and amplification takes place which biases transistor Q6 on. The collector current of transistor Q7 is sufficient to trigger the SCR which in turn controls relay RY3.

The charging of the capacitor C1 is detected by a zero detection network, as more fully described in my above-identified application, Ser. No. 405,503. Generally, favorable timing conditions are obtained when the RC network constitutes a bridge and the voltage level detection takes place in the proximity of a zero volts potential cross-over. These conditions are achieved by connecting two biased diodes CR1 and CR2 in the emitter leg of a transistor Q6. Thus, when the voltage of the potential across the capacitor C1 equals the voltage of the reference potential drop across R2, transistor Q6 turns on. This signal is amplified by amplifier transistor Q7 and is applied to the trigger of the SCR.

The diode CR3 isolates transistor Q5 from transistor Q6. It protects transistor Q6 from excessive reverse bias on its base emitter junction and prevents leakage current in its collector base junction from charging capacitor C1. Resistor R7 limits the biasing current through diodes CR1 and CR2. Resistor R8 limits the current through transistor Q7. Capacitor C2 and resistor R9 serve an important noise suppression function in that any noise, particularly that induced by nearby electromagnetic sources, is integrated by the action of capacitor C2 and resistor R9, minimizing any noise signals supplied to trigger 32 of the SCR. Diode CR4 serves the important function of back biasing the SCR to prevent triggering thereof when transient currents are applied to the trigger 32 due to line transients, e.g., rapid fluctuations in the supply voltage $+E_b$. To this end a continuous current is passed through diode CR4 by means of a resistor R10 connected to the $+E_b$ supply. The resulting potential drop across the diode CR4 back biases the SCR and prevents triggering thereof by transients due to line voltage variations and the like being applied to the trigger 32. This back biasing of the SCR also raises the threshold of noise signals which will trigger the SCR.

Resistor R3 is a discharging resistor for capacitor C1 and this discharge function is effected by shorting terminals 2 and 5 upon energization of relay RY3, as is conventional.

Figure 3:
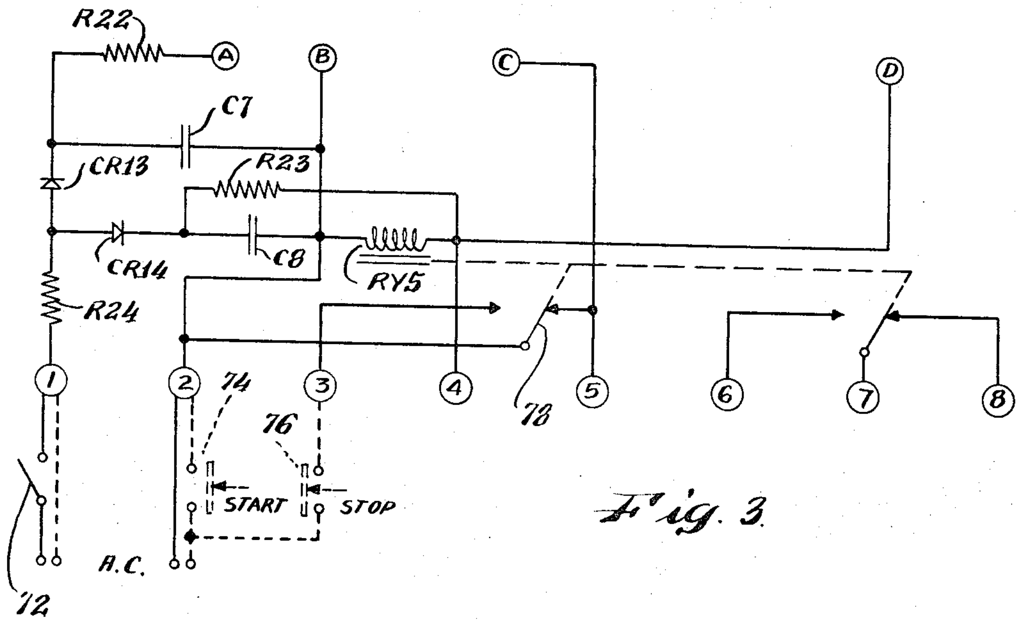
FIGURE 3 is a schematic electrical circuit diagram of alternative form of external supply and control circuitry for use with the electronic timer circuit of FIGURE 2.

In FIGURE 3 there is shown external circuitry that may be connected to terminals A, B, C and D of the general purpose timer circuit 64 of FIGURE 2 in order to effect the function of an interval timer. The interval timer may be externally connected at terminals 1, 2 and 3 for sustained contact initiation as shown by solid lines or momentary contact initiation as shown by dotted lines.

In the interval timer function, the relay RY5 is continuously energized throughout the timing interval. closing the start switch 72 for sustained contact initiation supplies AC power to relay RY5 via terminal 1, surge resistor R24, diode CR14, dropping resistor R23, relay RY5 and terminal 2. Additionally filtered DC is supplied to the timing circuit 64 at terminals A and B by the filtered half-wave rectifier comprising diode CR13, filter capacitor C7 and dropping resistor R22. At the end of a timing cycle, upon triggering of the SCR (FIGURE 2), relay RY5 is shorted by the SCR and diode CR4 of FIGURE 2 connected across terminals B and D of the timer circuit 64.

The circuit of FIGURE 3 may be operated as a momentary contact initiation interval timer by connecting a normally open start switch 74 and a normally closed stop switch 76 as shown by the dotted lines. Momentary closure of start switch 74 supplies power to relay RY5 to momentarily energize the same through terminal 2, relay coil RY5, resistor R23, diode CR14, surge resistor R14, and terminal 1. Upon energization, a holding circuit for relay RY5 is provided by its transfer contacts 78, the circuit being from terminal 3 through contacts 78, relay RY5, resistor R23, diode CR14, resistor R24 and terminal 1. The remaining operation is the same as previously explained. A timing interval may be stopped by depressing stop switch 76 momentarily opening it, thus releasing the holding circuit to relay RY5.

The circuit of FIGURE 2 is designed for a wide variety of timer applications with minimum variation in the parts required. However, it may vary over a wide range as the circuit is insensitive to line voltage variations as previously explained. The SCR is a type C106B supplied by General Electric; transistor Q5 is a type 2N3638, transistor Q6 is type 2N3393; and transistor Q7 is type 2N3638. Diodes CH1 through CR4 are all type DE50, supplied by Semiconductor Products. Variable resistor P1 takes the form of a potentiometer whose value varies with the time range. Similarly the values of capacitors C1 and resistor R4 also vary with range. Capacitor C2 is a .1 microfarad, 10 volt, +100% −20% capacitor. Resistor R1 is 680 ohms; resistor R2, 2.7 kilohms; resistor R3, 27 ohms; resistor R5, 27 kilohms; resistor R6, 4.7 kilohms; resistor R7, 10 kilohms; resistor R8, 2.2 kilohms; resistor R9, 1 kilohm; resistor R10, 47 kilohms; each one-half watt, ±10% resistors; and potentiometer P2 is a 1.5 kilohms, 2 watt, ±10%, potentiometer.

Examples of the values of P1, R4 and C1 are as follows: For a one second time range, P1 has a resistance of .25 megohms, R4 is 2.2 kilohms and C1 is 2 microfarads. For timers with ranges up to 60 seconds, the values of P1 and R4 remain unchanged. C1 increases linearly up to 100 microfarads for a sixty second timing interval. For long time ranges, for example, 900 seconds, P1 is 1 megohm; resistor R4, 8.2 kilohms; and capacitor C1, 450 microfarads. Components are rated at half a watt, in all cases. P1 and R4 have a ±10% rating, and C1 has a +75% −10% rating.

When the circuit shown in FIGURE 2 is used as a 117 volt AC delay timer, relay RY3 may be a 117 volt AC, three pole, double throw, 10 ampere, 1.8 kilohm relay (or a 48 volt DC, three pole, double throw, 10 amp, 1.8 kilohm relay). Diodes CR6 and CR8 are type DE200 and diodes CR7 and CR9 are type DE300 supplied by Semiconductor Products. Capacitor C3 is a 20 microfarad, +75%–10%, 200 volts, capacitor; capacitor C4 is 1 microfarad, +75% −10%, 200 volts, capacitor. Resistor R12 is 27 kilohms, ±5%; resistor R14 is 10 kilohms ±10%, both one watt resistors. Resistor R13 is 47 ohms; resistor R15 one megohm; resistor R16 100 ohms; each one-half watt, ±10% resistors.

When the interval timer shown in FIGURE 3 is operated from an alternating current supply of 117 volts, relay RY5 may be a 110 volts DC, two pole, double throw, 10 kilohms relay. Diodes CR13 and CR14 are each type DE300 supplied by Semiconductor Products. Capacitor C7 is a 20 microfarad, 200 volt capacitor; capacitor C8 is a 2 microfarad, 200 volt capacitor; both +75% −10% capacitors. Resistor R22 is 27 kilohms, rated at one watt; resistor R23 is 5 kilohms, rated at five watts, both ±5% resistors. Resistor R24 is 100 ohms ±10%, rated at one-half watt. The circuit shown in FIGURE 4 may be used in a family of delayed timers having time ranges up to sixty seconds.

The circuit behavior can best be explained as follows: Upon the application of 117 volt, sixty cycle alternating current to AC terminals 80 and 82, timing capacitor C102 will start to charge up due to current supplied through diode CR105, potentiometer P101, and resistor R105. Simultaneously an adjustable reference voltage is derived from the resistance divider path consisting of resistors R102 and R103; and variable resistor P102. As soon as the voltage across capacitor C102 exceeds the reference voltage, transistor Q101 will start conducting while its emitter current turns on SCR 100 which in turn energizes relay RY100. The diodes CR102, CR103, and CR104 had been employed to compensate for the junctions of transistor Q101, diode CR106, CR107 and SCR 100. Unfiltered one-way rectified DC has been used as charging current for the timing capacitor. The advantage inherent in such an operation is that long time durations are accomplished with relatively low resistance, and capacitance values. The governing time constant is $t=\pi RC$. Also, more driving base current is available for the sensing stage due to the fact that at one instant during each 60 cycle period the current reaches a peak value which is $\pi$ times higher than the average current flow through the timing resistor. The circuit details in conjunction with the relay have been designed to enforce reliability and short reset time of 50 milliseconds. After the SCR has been fired, holding current is derived from a network consisting of diode CR110, resistors R108, and R109, and capacitor C104. One set of contacts of the relay is utilized to discharge the timing capacitor. If power is turned off now, the circuit will reset immediately because capacitor C102 is discharged, and the SCR is rapidly deprived of holding current because of short time constant enforced by properly chosen values of capacitor C104 and resistor R108.

In the event that the reset time can be relaxed to 500 milliseconds, a simplification of the circuit is possible. The separate rectifier and holding circuit 84 for the SCR 100 is eliminated and a resistor R108 connected as shown by dotted lines to supply the keep-alive current to the SCR 100 from the filter capacitor C101 in the reference potential portion of the circuit.

It will be noted that in addition to providing increased timing delay by operating the charging circuit from half-wave rectified alternating current, the filter capacitor normally associated with this circuit has been eliminated. This insures that timing capacitor C102 once discharged through resistor R106 by closure of relay contacts 86 remains discharged until the discontinuance and subsequent re-energization of the circuit.

As proviously explained, diode CR107 provides some transient protection to the SCR 100 due to the back bias provided by the passage of any transient currents through diode CR107, as also previously explained. Capacitor C103 and resistor R107 provide noise protection for the SCR 100.

My invention of using half-wave rectified alternating current to charge the timing capacitor C102 may be utilized with any of the prior art capacitor charging circuits which are independent of supply voltage variation. As shown in FIGURE 4, it is used with the bridge-charging circuits and zero crossing voltage detector disclosed in my above-identified co-pending application, Ser. No. 405,503.

The components shown in FIGURE 4 may have the following values: SCR 100 is a type C106B supplied by General Electric. Transistor Q101 is a type 2N3565. Diodes CR102, CR103, and CR107 are type DE50; diodes CR104 and CR106 are type DE100; diodes CR105, CR108 and CR109 are type DE200; and diodes CR101 and CR110 are type DE300; all supplied by Semiconductor Products. The values of capacitor C102, variable resistor P101 (which takes the form of a potentiometer) and resistor R105 vary with time range.

Capacitor C101 is a 20 microfarad, 200 volt capacitor; capacitor C104 is a 1 microfarad, 200 volt capacitor, and both are +75% −10% capacitors. Capacitor C103 is a .1 microfarad, +100% −20%, 10 volt capacitor. Potentiometer 102 is 700 ohms +10% rated at 2 watts; resistor R101 is 10 ohms, ±10%, rated at 5 watts; resistor R102, 6 kilohms, ±5%, rated at 5 watts; resistor R103, 330 ohms, ±10%, rated at one-half watt; resistor R104, 1.5 kilohms, ±10%, rated at two watts; resistor R106, 27 ohms, ±10%, rated at one-half watt; resistor R107, 1 kilohm, ±10%, rated at one-half watt; resistor R108, 18 kilohms, ±10%, rated at one watt; and resistor R109, 1 megohm, ±10%, rated at one-half watt. Relay 100 then is a 117 volt AC, two pole, double throw, 10 amp, 1.8 kilohm relay.

For a timer having a time range of one second, potentiometer P101 may be 1 megohm; resistor R105, 8.2 kilohms; and capacitor C102, 5 microfarads. For a 10 second time range, P101 may be 2 megohms; resistor R105, 15 kilohms; and capacitor C102, 20 microfarads. For a 60 second time range, potentiometer P101 may be 2.5 megohms; resistor R105, 18 kilohms; and capacitor C102, 100 microfarads. In all cases potentiometer P101 and resistor R105 are ±10%, one-half watt resistors, and capacitor C102 is a +75% −10% capacitor.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention, which, as a matter of language, might be said to fall therebetween.

Having described my invention, what I claim as new and desire to secure by Letters Patent is:

1. An electronic timer circuit comprising:
- (A) a bridge circuit energized from a source of alternating voltage and including first and second parallel branches;
- (B) means for rectifying and filtering the current in said first branch to provide at a point in said first branch a reference direct voltage which is a predetermined fraction of said alternating voltage;
- (C) said second branch including means for charging a timing capacitor through a resistor with unfiltered half-wave pulsating direct current derived from said alternating voltage; and
- (D) an electronic sensing means for providing an output signal when the voltage across said capacitor has a predetermined relation to the voltage at said point.

2. An electronic timer circuit as defined in claim 1, and:
- (E) an output circuit comprising:
  - (a) a further source of half-wave rectified unfiltered curent derived from said source of alternating voltage,
  - (b) a relay, and
  - (c) a controlled rectifier for controlling the energization of said relay from said further source of half-wave current in response to said output signal.

3. An electronic timer circuit as defined in claim 1, and:
- (F) a holding circuit for said controlled rectifier comprising:
  - (a) a separate rectifier, and
  - (b) a filter capacitor.

4. An electronic timer as defined in claim 3, and:
  - (c) a resistor connected in parallel across said filter capacitor.

5. An electronic timer circuit as defined in claim 1, and:
- (F) means connecting said controlled rectifier in circuit with a source of direct current to supply a holding current to said controlled rectifier.

6. An electronic timer circuit as defined in claim 5 wherein the means for rectifying and filtering the current in said first branch includes:
- (A) a filter capacitor;
- (B) a resistor; and (C) means for connecting said resistor across said filter capacitor at the conclusion of a timing cycle.

7. An electronic timer circuit as defined in claim 6 wherein said timer circuit is a sustained contact initiation, delay timer, and further comprises:

(D) a relay energized upon the conclusion of a timer interval; and said means for connecting said filter resistor across said capacitor comprises contacts of said relay.

8. The timer circuit defined in claim 6, further comprising means for connecting a resistor across said timing capacitor at the conclusion of a timing cycle.

References Cited

UNITED STATES PATENTS

| | | | |
|---|---|---|---|
| 2,867,754 | 1/1959 | O'Bleness | 317—142 |
| 3,151,523 | 10/1964 | King | 317—142 X |
| 3,182,227 | 5/1965 | Brittain et al. | 317—142 |
| 3,243,796 | 3/1966 | Harmon et al. | 317—148.5 |
| 3,333,175 | 7/1967 | Klyce | 317—142 X |

LEE T. HIX, *Primary Examiner.*

U.S. Cl. X.R.

317—148.5; 307—252, 293